US 11,573,346 B2

(12) United States Patent
Nasser et al.

(10) Patent No.: US 11,573,346 B2
(45) Date of Patent: Feb. 7, 2023

(54) DETERMINING A SEISMIC QUALITY FACTOR FOR SUBSURFACE FORMATIONS FOR MARINE VERTICAL SEISMIC PROFILES

(71) Applicant: Saudi Arabian Oil Company, Dhahran (SA)

(72) Inventors: Husain Salman Nasser, Safwa (SA); Jianjiang Chen, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 149 days.

(21) Appl. No.: 17/231,806

(22) Filed: Apr. 15, 2021

(65) Prior Publication Data

US 2022/0334283 A1 Oct. 20, 2022

(51) Int. Cl.
*G01V 1/40* (2006.01)
*E21B 49/00* (2006.01)
*G01V 1/18* (2006.01)

(52) U.S. Cl.
CPC ............... *G01V 1/40* (2013.01); *E21B 49/00* (2013.01); *G01V 1/181* (2013.01); *G01V 1/186* (2013.01);
(Continued)

(58) Field of Classification Search
CPC .......... G01V 1/40; G01V 1/181; G01V 1/186; G01V 1/189; G01V 2210/1293;
(Continued)

(56) References Cited

U.S. PATENT DOCUMENTS 5,511,038 A * 4/1996 Angeleri ............... G01V 1/42
367/40
5,771,170 A * 6/1998 Withers ................. G01V 1/42
702/14
(Continued)

FOREIGN PATENT DOCUMENTS

CN 108919354 11/2018

OTHER PUBLICATIONS

Al Dulaijan et al., "Azimuthal anisotropy analysis of walkaround vertical seismic profiling vertical seismic profiling: a case study from Saudi Arabia." Geophysical Prospecting 60.6, Oct. 2012, 1082-1094, 13 pages.
(Continued)

*Primary Examiner* — Mohammad K Islam
(74) *Attorney, Agent, or Firm* — Fish & Richardson P.C.

(57) ABSTRACT

A seismic attenuation quality factor Q is determined for seismic signals at intervals of subsurface formations between a seismic source at a marine level surface and one or more receivers of a well. Hydrophone and geophone data are obtained. A reference trace is generated from the hydrophone and geophone data. Vertical seismic profile (VSP) traces are received. First break picking of the VSP traces is performed. VSP data representing particle motion measured by a receiver of the well are generated. The reference trace is injected into the VSP data. A ratio of spectral amplitudes of a direct arrival event of the VSP data and the reference trace is determined. From the ratio, a quality factor Q is generated representing a time and depth compensated attenuation value of seismic signals between the seismic source at the marine level surface and the first receiver.

20 Claims, 10 Drawing Sheets

(52) U.S. Cl.
CPC ...... *G01V 1/189* (2013.01); *G01V 2210/1293* (2013.01); *G01V 2210/1429* (2013.01); *G01V 2210/324* (2013.01); *G01V 2210/60* (2013.01); *G01V 2210/64* (2013.01)

(58) Field of Classification Search
CPC ..... G01V 2210/1429; G01V 2210/324; G01V 2210/60; G01V 2210/64; G01V 2200/14; G01V 2210/161; G01V 1/42; E21B 49/00
See application file for complete search history.

(56) References Cited

U.S. PATENT DOCUMENTS

| | | | | |
|---|---|---|---|---|
| 5,971,095 | A * | 10/1999 | Ozbek | G01V 1/364 367/43 |
| 6,147,929 | A * | 11/2000 | Parra | G01V 1/42 367/57 |
| 6,516,275 | B2 | 2/2003 | Lazaratos | |
| 6,807,489 | B2 | 10/2004 | Naville et al. | |
| 6,917,564 | B2 | 7/2005 | Leaney | |
| 6,931,324 | B2 | 8/2005 | Taner et al. | |
| 7,088,639 | B2 | 8/2006 | Walls et al. | |
| 7,376,517 | B2 | 5/2008 | Rickett | |
| 7,555,389 | B2 | 6/2009 | Cavalca et al. | |
| 8,576,663 | B2 | 11/2013 | Mortel et al. | |
| 9,671,511 | B2 * | 6/2017 | Winnett | G01V 1/364 |
| 10,267,937 | B2 | 4/2019 | Hu | |
| 10,436,024 | B2 * | 10/2019 | Bakulin | G01V 1/46 |
| 2002/0091487 | A1 | 7/2002 | Moerig et al. | |
| 2004/0148148 | A1* | 7/2004 | Butler | E21B 49/00 703/10 |
| 2007/0259432 | A1* | 11/2007 | Zhao | G01V 1/42 436/25 |
| 2008/0144438 | A1* | 6/2008 | Ferber | G01V 1/20 367/56 |
| 2008/0175102 | A1* | 7/2008 | Hegna | G01V 1/3861 367/144 |
| 2009/0185444 | A1* | 7/2009 | Kluver | G01V 1/36 367/24 |
| 2010/0097886 | A1 | 4/2010 | Day et al. | |
| 2011/0267921 | A1 | 11/2011 | Mortel et al. | |
| 2012/0106292 | A1* | 5/2012 | Fuller | G01V 1/42 367/27 |
| 2012/0106294 | A1* | 5/2012 | Blias | G01V 1/42 367/38 |
| 2012/0245851 | A1* | 9/2012 | Ji | G01V 1/364 702/17 |
| 2013/0215717 | A1* | 8/2013 | Hofland | G01V 1/288 367/59 |
| 2013/0265851 | A1* | 10/2013 | Faber | G01V 1/42 367/25 |
| 2014/0064027 | A1* | 3/2014 | Winnett | G01V 1/3808 367/24 |
| 2014/0336940 | A1* | 11/2014 | Bettinelli | G01V 1/306 702/14 |
| 2015/0000997 | A1* | 1/2015 | Richer De Forges | G01V 1/135 181/119 |
| 2015/0168573 | A1 | 6/2015 | Zhang et al. | |
| 2015/0293249 | A1* | 10/2015 | Peng | G01V 1/364 702/16 |
| 2015/0362611 | A1* | 12/2015 | Lecerf | G01V 1/28 367/7 |
| 2016/0091623 | A1 | 3/2016 | Yu et al. | |
| 2016/0178772 | A1* | 6/2016 | Carter | G01V 1/306 702/17 |
| 2016/0187513 | A1* | 6/2016 | Poole | G01V 1/362 702/16 |
| 2016/0370484 | A1* | 12/2016 | Cotton | G01V 1/308 |
| 2017/0023690 | A1* | 1/2017 | Lee | G01V 1/364 |
| 2017/0235006 | A1* | 8/2017 | Ellmauthaler | G01V 1/42 702/6 |
| 2018/0106920 | A1* | 4/2018 | Oukili | G01V 1/364 |
| 2019/0049612 | A1 | 2/2019 | Padhi et al. | |
| 2019/0212461 | A1* | 7/2019 | Torres Tamanaja | G01V 1/04 |
| 2019/0302291 | A1* | 10/2019 | Lol | E21B 49/00 |
| 2019/0324166 | A1* | 10/2019 | Lolla | G01V 1/42 |
| 2020/0018149 | A1* | 1/2020 | Luo | E21B 47/12 |
| 2021/0103068 | A1 | 4/2021 | Nasser et al. | |

OTHER PUBLICATIONS

Dasgupta et al., "Estimation of Q from surface seismic reflection data." Geophysics 63.6, Nov. 1998, 2120-2128, 9 pages.
Li et al., "Tomographic inversion of near-surface Q factor by combining surface and cross-hole seismic surveys." Applied Geophysics 13.1, Mar. 2016, 93-102, 10 pages.
Tzimeas., "Image resolution analysis: A new, robust approach to seismic survey design" Diss. Texas A&M University, May 2004, 191 pages.
PCT International Search Report and Written Opinion in International Appln. No. PCT/US2022/024783, dated Jul. 26, 2022, 16 pages.
Zhang et al., "Compensation for absorption and dispertion in prestack migration: an effective Q approach," Geophysics, 78(1), Jan. 2013, S1-S14, 14 pages.
Zhang, "Seismic absorption estimation and compensation," PHD Thesis for Doctor of Philosophy, University of British Columbia, Vancouver, Nov. 2008, 109 pages.

* cited by examiner

DETERMINING A SEISMIC QUALITY FACTOR FOR SUBSURFACE FORMATIONS FOR MARINE VERTICAL SEISMIC PROFILES

TECHNICAL FIELD

The present disclosure generally relates to an approach for identifying geologic features in subsurface formations including deriving seismic absorption quality factors (Q) from vertical seismic profiles (VSP's) in marine contexts.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications including identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Similarly, analysis of the time it takes seismic surface waves to travel from source to sensor can provide information about near surface features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This disclosure describes methods and systems to estimate an elastic attenuation quality factor model (also called a Q factor, Q value, Q model, or simply Q) from Vertical Seismic Profile (VSP) data. In seismic modeling and analysis, the quality factor Q quantifies the energy loss of a propagating wavelet with time due to fluid movement and friction with grain boundary. This can also be referred to as a seismic attenuation factor. The effect can be referred to as Earth's absorption, and can be considered to be an undesired distortion to the signal wavelet.

Generally, Q models are used to remove the effects of Earth's absorption from surface seismic reflection data. This restores high-frequency signal amplitudes, leading to higher resolution images and better amplitude analysis of seismic data. A more accurate model improves this correction. This inverse-Q filtering uses Q values for the complete seismic ray path from the source location to receiver. A Q-model for entire seismic trace records is thus used to perform the correction. The process described in this specification provides Q-values that are otherwise missing or inaccurate for existing VSP's. The improved Q estimates from the methods subsequently described enable more detailed and more accurate Q models for inverse-Q filtering of surface seismic data.

The data processing system and processes described in this specification provide one or more advantages. The methods and systems subsequently described overcome an issue of the poor quality of a first number of traces (such as the first few traces) due to an existence of multiple casing strings in a seismic borehole. In marine contexts, a reference trace that is typically used for Q estimation is deeper than a preferable, shallower reference traces that provides data for a shallowest part of a local geology (subsurface). The result is a relatively poor Q estimation, because the reference trace represents a geology that is deeper than where most subsurface attenuation occurs.

To overcome this issue, the methods and systems described in this specification include deploying a dual sensor at a sea floor. The sensor includes a hydrophone component and a vertical geophone component. For marine VSP, a near-field hydrophone is generally deployed to account for trigger delay. The system uses a matching filter between a hydrophone response and a geophone response to eliminate a source ghost that typically interferes with direct wave arrivals from the sensor.

The hydrophone component is a scalar. At the sea floor, the source ghost has an opposite polarity to the geophone. A summation of these signals removes the source ghosting from the seismic signals. A resulting trace is used as the reference trace for Q estimation. The systems and methods described in this specification, by resolving interference form source ghosting, provide a better source signature deconvolution operator for Q modeling. The systems and methods ensure that the delivered Q values do not have the Q effect of the seismic signal traveling through the water.

In a general aspect, a method is for determining a seismic attenuation quality factor Q for seismic signals at intervals of subsurface formations between a seismic source at a marine level surface and one or more receivers of a well. The method includes obtaining sensor data from a dual sensor comprising a hydrophone and a geophone, the sensor data including a hydrophone component and a geophone component; generating a reference trace from the hydrophone component and the geophone component of the sensor data; receiving vertical seismic profile traces; perform a first break picking of the vertical seismic profile traces; generating, based on the first break picking, vertical seismic profile data representing particle motion measured by a first receiver of the one or more receivers of the well; injecting the reference trace into the vertical seismic profile data; determining a ratio of spectral amplitudes of a direct arrival event of the vertical seismic profile data and the reference trace; and generating, from the ratio, a quality factor Q representing a time and depth compensated attenuation value of seismic signals between the seismic source at the marine level surface and the first receiver.

In some implementations, generating a reference trace from the hydrophone component and the geophone component of the sensor data comprises: applying a matching filter to transform the hydrophone component of the sensor data to match the geophone component; and summing the transformed hydrophone component and the geophone component.

In some implementations, the method includes comparing each trace of the vertical seismic profile traces to a quality threshold; and removing, from the vertical seismic profile traces, each trace that does not satisfy the quality threshold.

In some implementations, the method includes determining a geometry of the well and a location of the dual sensor; and performing a correction on the vertical seismic profile traces to account for a geometrical spreading of propagating seismic signals used to generate the vertical seismic profile data.

In some implementations, the dual sensor is deployed at or near a well location at the marine level surface of the subsurface formation.

In some implementations, the ratio is defined by $$Q = -\pi\left(\frac{t_2 - t_1}{m}\right), m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is the natural logarithm of the ratio of the spectral amplitudes. In some implementations, $A_1$ is a Klauder wavelet amplitude spectra at time $t_1=0$ seconds and depth $d_1=0$ meters, and $A_2$ is the amplitude spectra of the direct arrival event at time $t_2$ of the first receiver from the marine level surface at depth $d_2=0$ meters.

In a general aspect, a system determines a seismic attenuation quality factor Q for seismic signals at intervals of subsurface formations between a seismic source at a marine level surface and one or more receivers of a well. The system includes at least one processor; and a memory storing instructions that, when executed by the at least one processor, cause the at least one processor to perform operations comprising: obtaining sensor data from a dual sensor comprising a hydrophone and a geophone, the sensor data including a hydrophone component and a geophone component; generating a reference trace from the hydrophone component and the geophone component of the sensor data; receiving vertical seismic profile traces; perform a first break picking of the vertical seismic profile traces; generating, based on the first break picking, vertical seismic profile data representing particle motion measured by a first receiver of the one or more receivers of the well; inject the reference trace into the vertical seismic profile data; determining a ratio of spectral amplitudes of a direct arrival event of the vertical seismic profile data and the reference trace; and generating, from the ratio, a quality factor Q representing a time and depth compensated attenuation value of seismic signals between the seismic source at the marine level surface and the first receiver.

In some implementations, generating a reference trace from the hydrophone component and the geophone component of the sensor data comprises: applying a matching filter to transform the hydrophone component of the sensor data to match the geophone component; and summing the transformed hydrophone component and the geophone component.

In some implementations, the operations further comprise comparing each trace of the vertical seismic profile traces to a quality threshold; and removing, from the vertical seismic profile traces, each trace that does not satisfy the quality threshold.

In some implementations, the operations further comprise determining a geometry of the well and a location of the dual sensor; and performing a correction on the vertical seismic profile traces to account for a geometrical spreading of propagating seismic signals used to generate the vertical seismic profile data.

In some implementations, the dual sensor is deployed at or near a well location at the marine level surface of the subsurface formation.

In a general aspect, one or more non-transitory computer readable media store instructions for determining a seismic attenuation quality factor Q for seismic signals at intervals of subsurface formations between a seismic source at a marine level surface and one or more receivers of a well. The one or more instructions are configured to cause at least one processor, when executed by the at least one processor, to perform operations comprising: obtaining sensor data from a dual sensor comprising a hydrophone and a geophone, the sensor data including a hydrophone component and a geophone component; generating a reference trace from the hydrophone component and the geophone component of the sensor data; receiving vertical seismic profile traces; perform a first break picking of the vertical seismic profile traces; generating, based on the first break picking, vertical seismic profile data representing particle motion measured by a first receiver of the one or more receivers of the well; inject the reference trace into the vertical seismic profile data; determining a ratio of spectral amplitudes of a direct arrival event of the vertical seismic profile data and the reference trace; and generating, from the ratio, a quality factor Q representing a time and depth compensated attenuation value of seismic signals between the seismic source at the marine level surface and the first receiver.

In some implementations, generating a reference trace from the hydrophone component and the geophone component of the sensor data comprises: applying a matching filter to transform the hydrophone component of the sensor data to match the geophone component; and summing the transformed hydrophone component and the geophone component.

In some implementations, the operations further comprise comparing each trace of the vertical seismic profile traces to a quality threshold; and removing, from the vertical seismic profile traces, each trace that does not satisfy the quality threshold.

In some implementations, the operations further comprise determining a geometry of the well and a location of the dual sensor; and performing a correction on the vertical seismic profile traces to account for a geometrical spreading of propagating seismic signals used to generate the vertical seismic profile data.

In some implementations, the dual sensor is deployed at or near a well location at the marine level surface of the subsurface formation.

In some implementations, the ratio is defined by $$Q = -\pi\left(\frac{t_2 - t_1}{m}\right), m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is the natural logarithm of the ratio of the spectral amplitudes. In some implementations, $A_1$ is a Klauder wavelet amplitude spectra at time $t_1=0$ seconds and depth $d_1=0$ meters, and $A_2$ is the amplitude spectra of the direct arrival event at time $t_2$ of the first receiver from the marine level surface at depth $d_2=0$ meters.

The details of one or more embodiments are set forth in the accompanying drawings and the description below. Other features and advantages will be apparent from the description and drawings, and from the claims.

DETAILED DESCRIPTION

Figure 1:
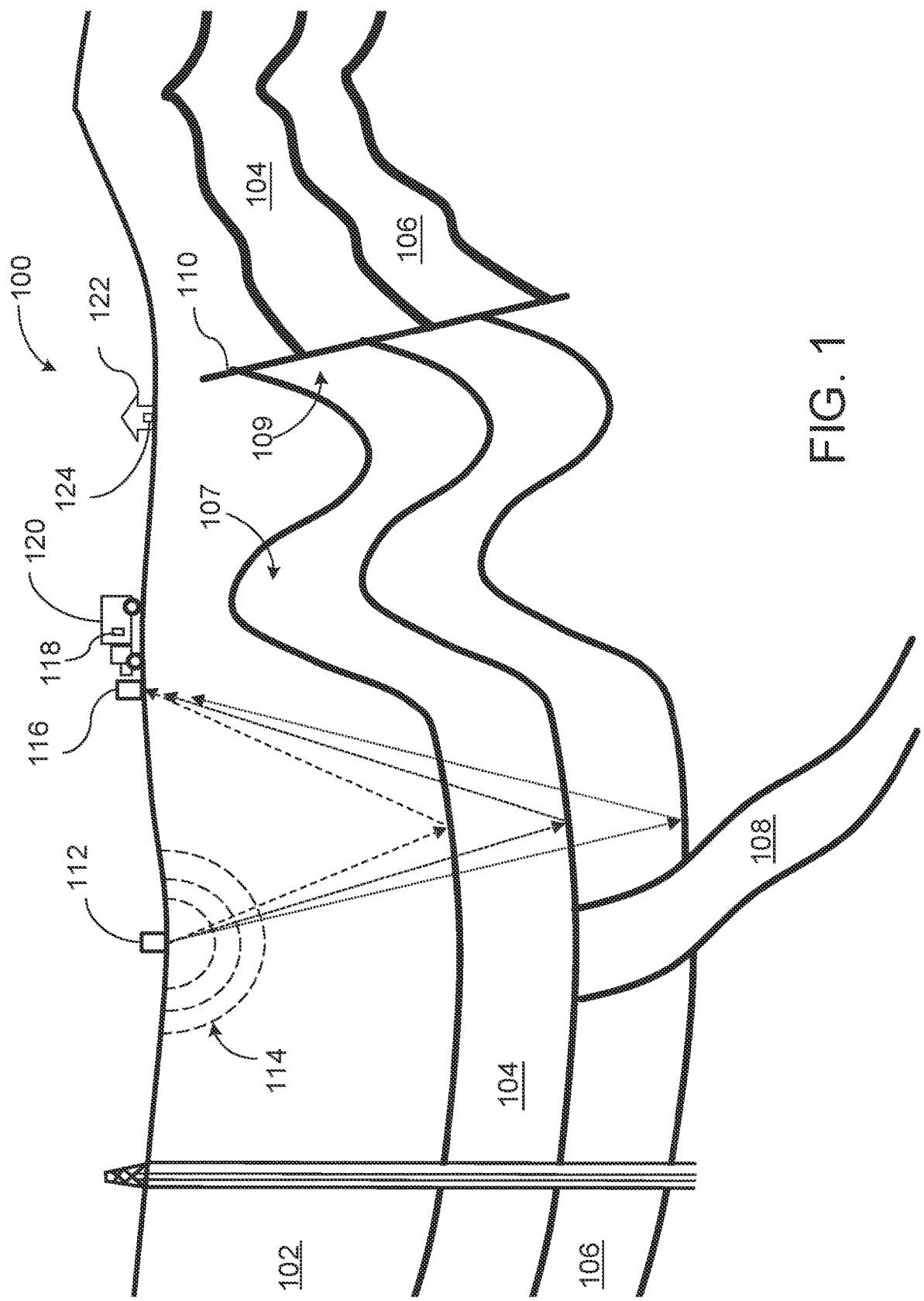
FIG. 1 is a schematic view of a seismic survey being performed to map subterranean features such as facies and faults.

This specification describes workflows for, but is not limited to, estimating seismic attenuation factor values for subsurface regions below a sea floor. It is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

This specification describes data processing systems and methods for generating quality factor (Q) models for the subsurface from the sea floor and below. Generally, Q represents a ratio of stored energy to dispersed energy, and measures a relative energy loss per oscillation cycle. The data processing system is configured to remove the effects of Earth's absorption from surface seismic reflection data. Generally, when Q models are more accurate, removal of these absorption effects is improved. This can be called inverse-Q filtering. Inverse-Q filtering is determined using Q values for the complete seismic ray path from the source location to receiver. The data processing system can use a Q-model for entire seismic trace records, from the marine surface to a deepest reflector. This includes shallow portion of the model for the interval from the VSP source to the first useable VSP downhole receiver.

For Q derivation, the data processing system is configured to provide Q estimation values for the shallow region, or the region between the marine surface and the first downhole receiver of the seismic sensor array. This workflow is performed by a computing system (such as computing system 124 described in relation to FIG. 1), including one or more processing devices in communication with one or more sensors, to derive Q-values for the interval from source located at the marine surface to a first useable VSP receiver, which would generally otherwise be estimated by extrapolation from deeper Q-values. In other words, the workflow generates the missing shallow Q-values, enabling more detailed and more accurate Q models required for inverse-Q filtering of marine surface seismic data.

In contrast to land seismic acquisition, workflows for marine seismic acquisition use an impulsive source. Cross correlation with the pilot is generally unavailable for obtaining the best downgoing waves for Q estimation without interference caused by signal multiples and ghost effects. When using an impulsive source for marine vertical seismic imaging, the system uses a source signature deconvolution operator to eliminate ghost effects from the data. To obtain a reference trace, deploying dual sensor will provide us with the reference trace for Q estimation tackling the main two challenges, which are the source signature using far field hydrophone and the shallowest reference trace starting from sea floor for Q computation.

Generally, downhole VSP receivers are either geophones (such as particle velocity meters) or accelerometers (particle acceleration meters). In the case of the later, the acceleration traces are typically transformed to velocity by removal of the accelerometer impulse response (the response to an acceleration impulse) and time-integration to velocity. If geophone sensors are used, an inverse filter is applied to remove the geophone impulse response (the response of a geophone to a velocity impulse). A Vibroseis source has a far-field particle displacement that is proportional to the sweep ground force. In the present disclosure, the data processing system transfers the particle motion of the receiver to that of the Vibroseis source by time-integration to displacement.

FIG. 1 is a schematic view of a seismic survey being performed to map subterranean features such as facies and faults in a subterranean formation 100 under a marine feature (such as under the sea or ocean). The seismic survey can be conducted for seismic imaging of a subterranean geological formation under the marine surface using the improved estimation of Q near the marine surface, as described in this specification. The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the marine surface. The computing system is configured to estimate the seismic attenuation factor Q near the marine surface by using a dual-sensor approach. This provides a reference trace for Q estimation by using the source signature of a far field hydrophone sensor and the shallowest reference trace relative to the marine surface. The dual sensor configuration and near surface regions are described in relation to FIG. 7.

The velocity of these seismic waves depends on properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot. Another example of the sensors 116 is described in relation to in FIG. 7.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing the subterranean formation 100. The seismic cube can also display results of the analysis of the seismic data associated with the seismic survey.

Figure 2:
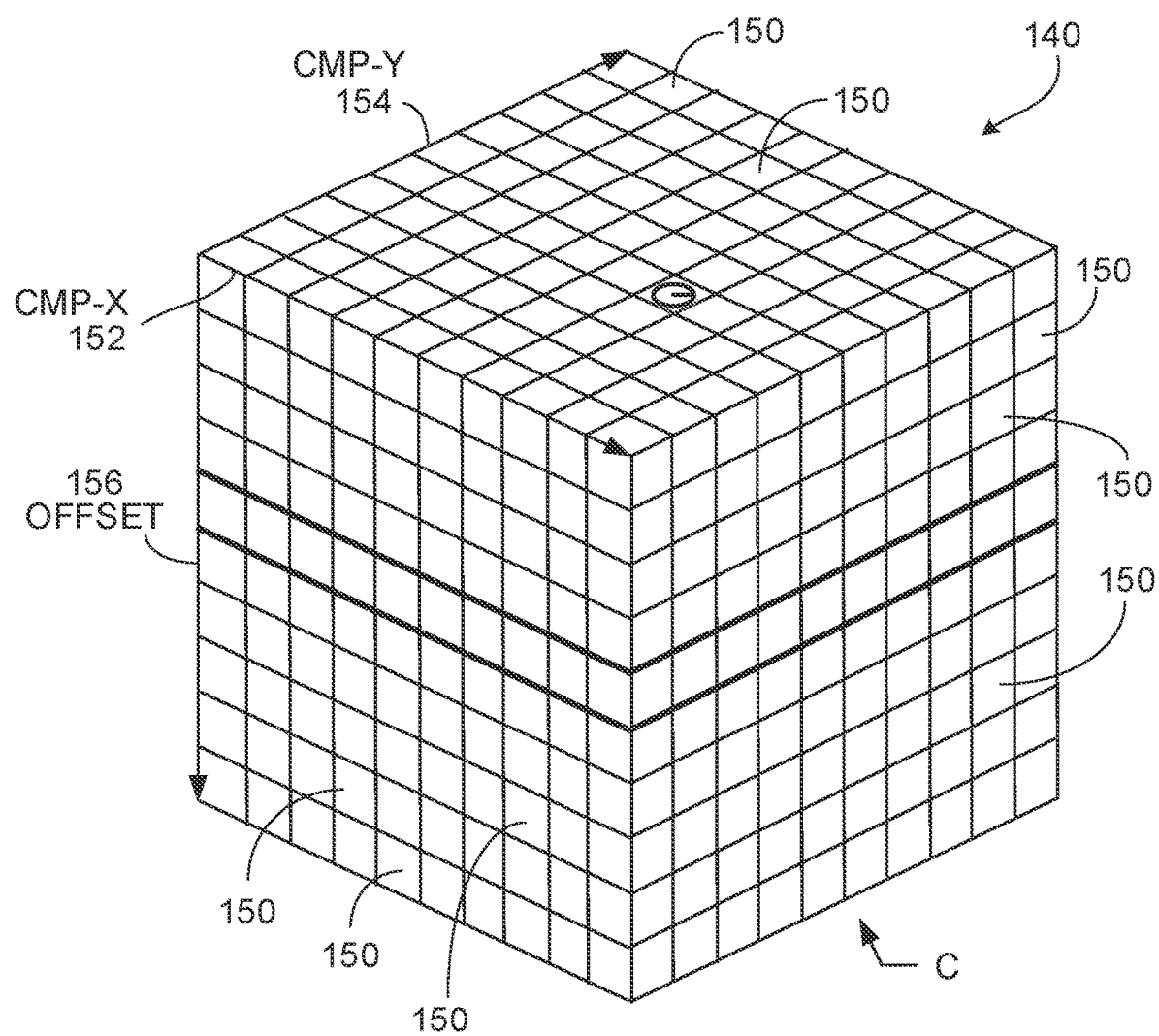
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and an offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
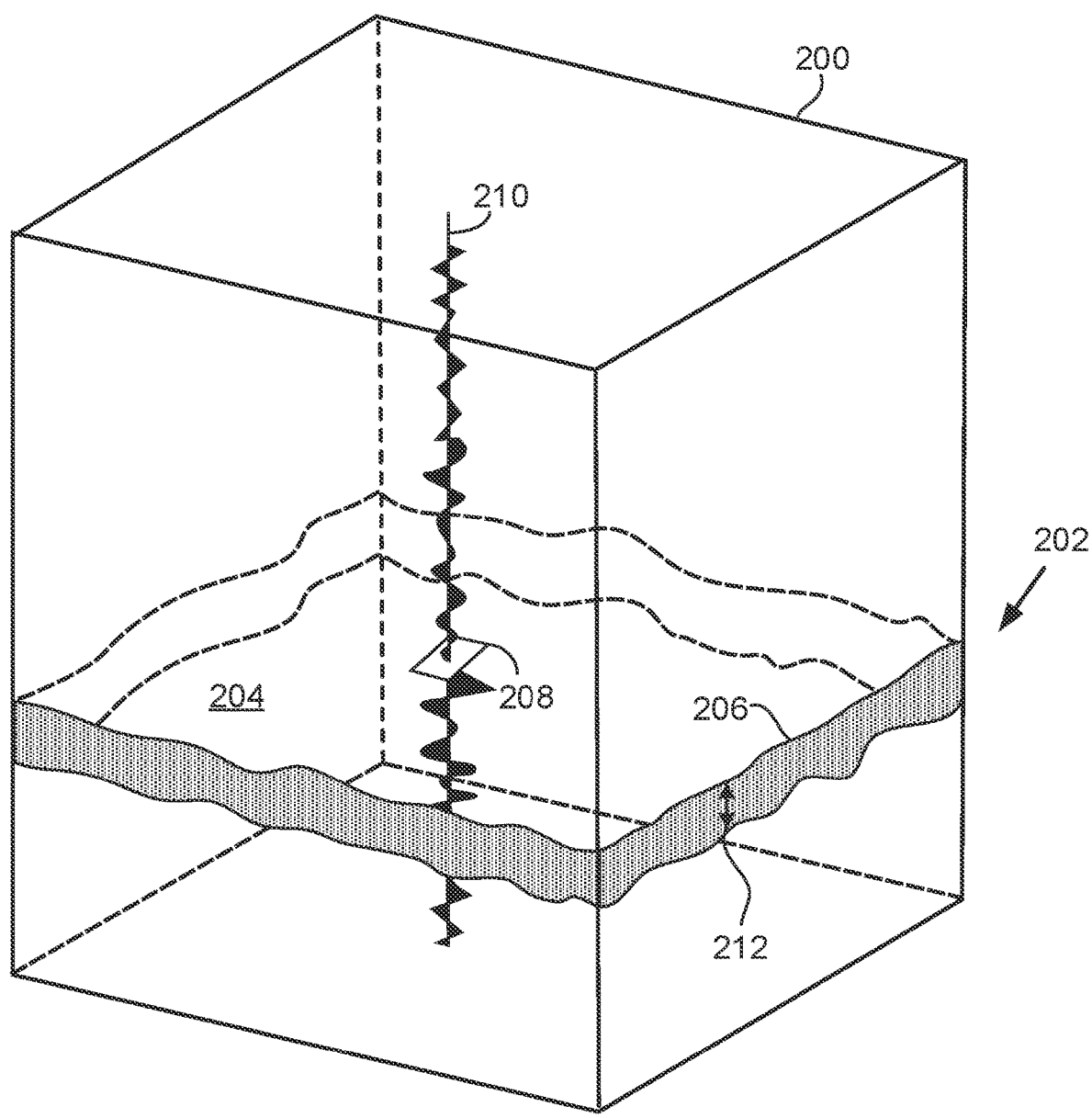
FIG. 3 illustrates a stratigraphic trace within the three-dimensional cube of FIG. 2.

FIG. 3 illustrates a seismic cube 200 representing a formation. The seismic cube has a stratum 202 based on a surface (for example, an amplitude surface 204) and a stratigraphic horizon 206. The amplitude surface 204 and the stratigraphic horizon 206 are grids that include many cells such as exemplary cell 208. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4C:
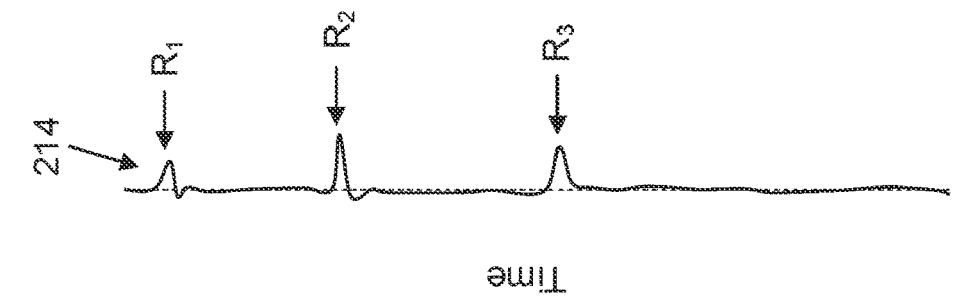
FIGS. 4A, 4B, and 4C schematically illustrate the process stacking a group of seismic traces to improve the signal to noise ratio of the traces.
Figure 4B:
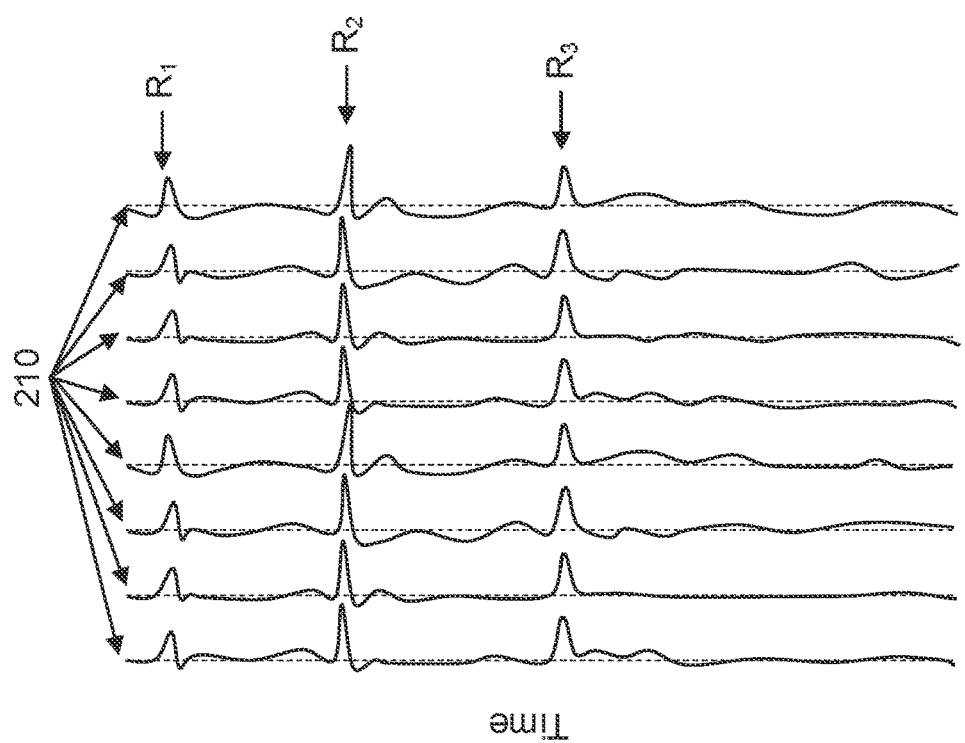
Figure 4A:
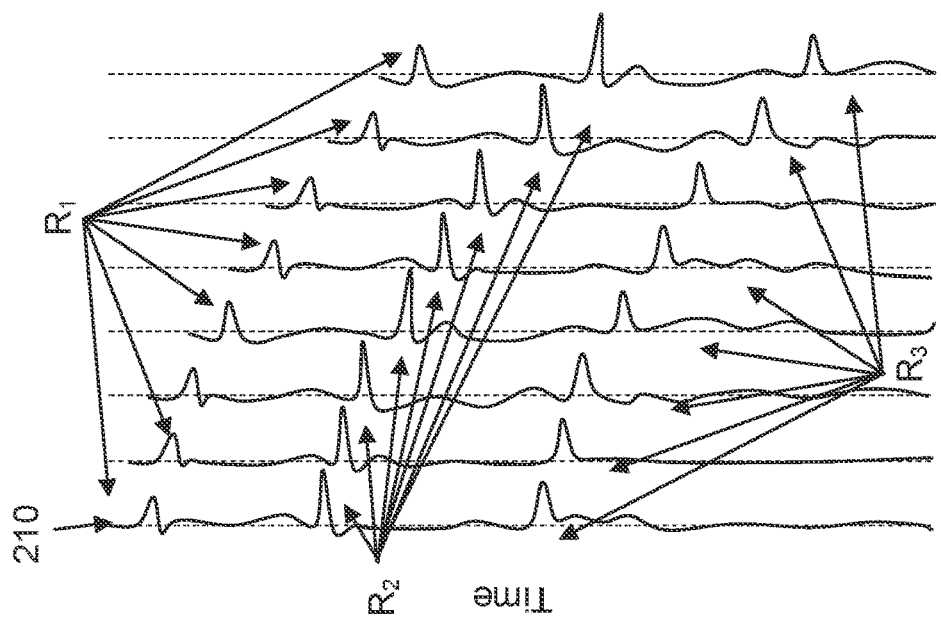

FIGS. 4A, 4B, and 4C schematically illustrate the process stacking a group of seismic traces 210 to improve the signal to noise ratio of the traces. FIG. 4A illustrates a common midpoint (CMP) gather of eight traces 210 generated by a set of sources and sensors that share a common midpoint. For ease of explanation, the traces are assumed to have been generated by reflections from three horizontal horizons.

The traces 210 are arranged with increasing offset from the CMP. The offset of the traces 210 from the CMP increase from left to right and the reflection time increases from top to bottom. Increasing offset from the common midpoint increases the angle of a seismic wave that between a source and a sensor, increases the distance the wave travels between the source and the sensor, and increases the slant reflection time. The increasing time for the reflections ($R_1$, $R_2$, and $R_3$) from each of the horizons to arrive for source-sensor pairs with increasing offsets from the CMP reflects this increased slant time.

FIG. 4B shows the traces 210 after normal moveout (NMO) correction. NMO is the difference between vertical reflection time and the slant reflection time for a given source-sensor pair. This correction places reflections ($R_1$, $R_2$, and $R_3$) from common horizons at the same arrival time. The NMO correction is a function of the vertical reflection time for a specific horizon, the offset of a specific source-sensor pair, and the velocity of the seismic wave in the subterranean formation. The vertical reflection time for a specific horizon and the offset for a specific source-sensor pair are known parameters for each trace. However, the velocity is usually not readily available. As previously discussed, the velocity of seismic waves depends on properties, for example, density, porosity, and fluid content of the medium through which the seismic waves are traveling and consequently varies with location in the subterranean formation being studied.

FIG. 4C shows a stack trace 214 generated by summing the traces 210 of the CMP gather and dividing the resulting amplitudes by the number of traces in the gather. The number of traces in the gather is also referred to as the fold of the gather. The noise tends to cancel out and the reflections ($R_1$, $R_2$, and $R_3$) from the horizons of the subterranean formation are enhanced.

Figure 5:
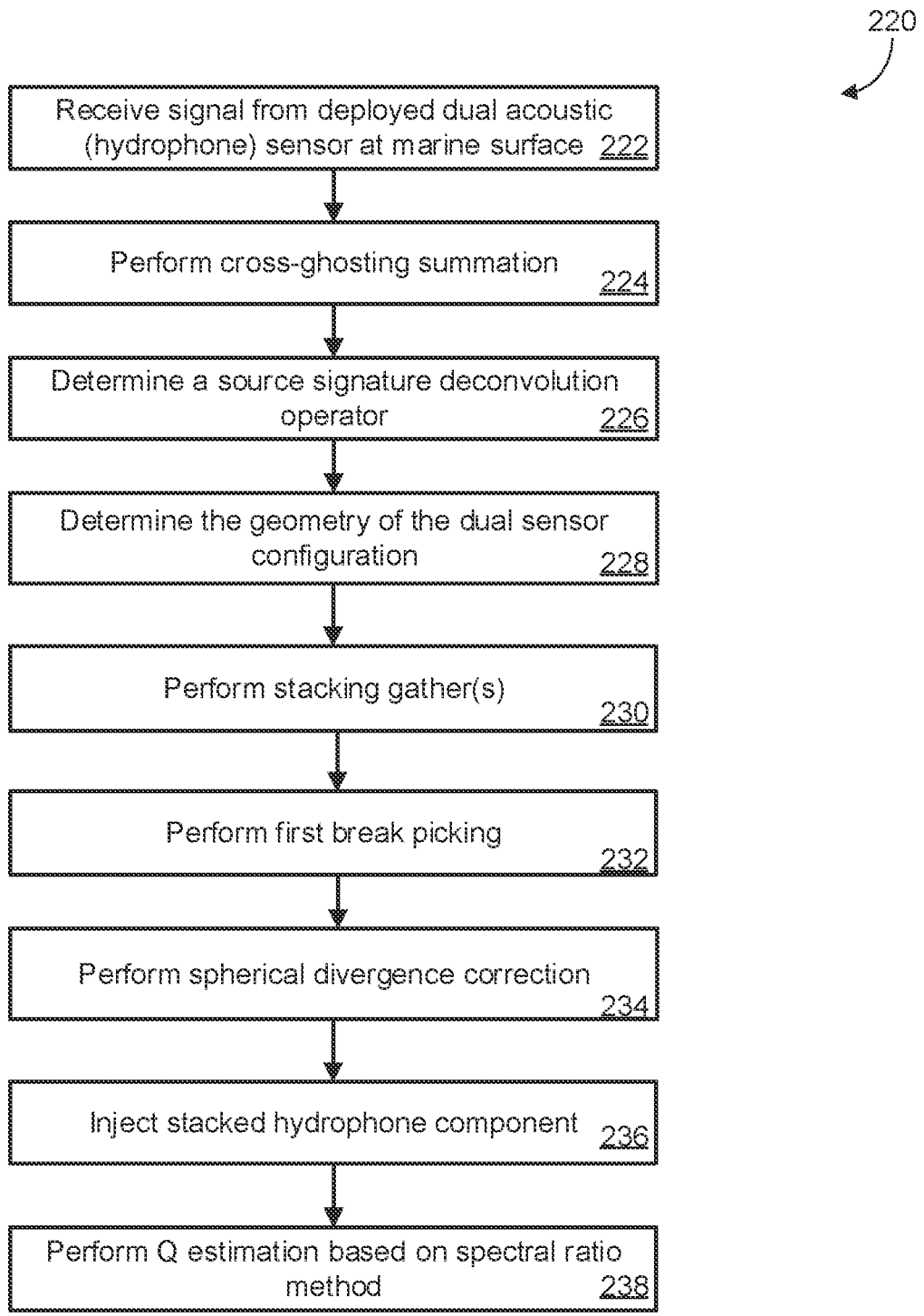
FIG. 5 shows a process for estimating seismic attenuation factor values for subsurface regions below a sea floor.
Figure 6:
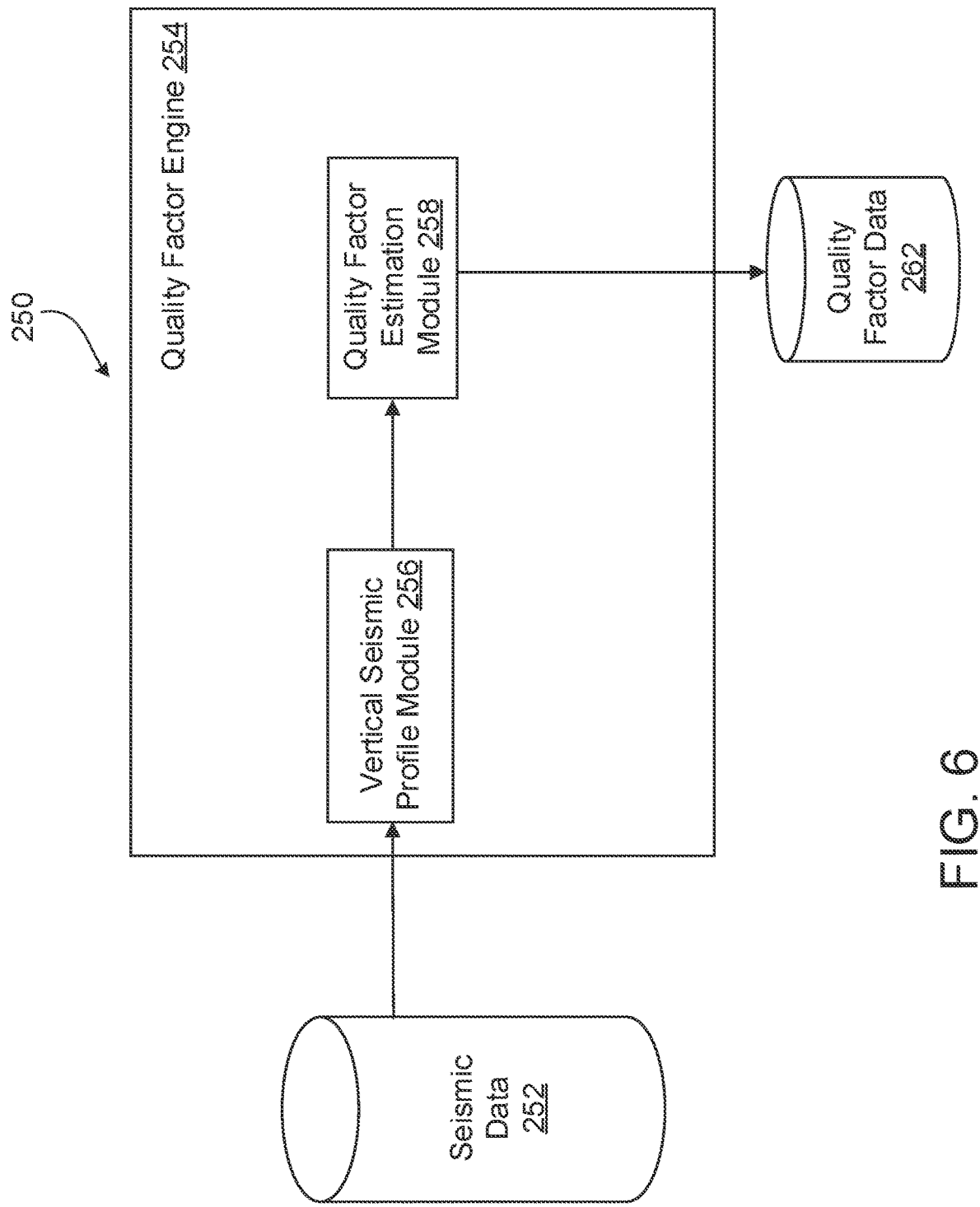
FIG. 6 shows a data processing system for estimating seismic attenuation factor values for subsurface regions below a sea floor.

Turning to FIGS. 5-6, a data processing system 250 and process 220 described in relation to FIGS. 5-6 are configured to estimate the Q factor for VSPs near a marine surface. FIG. 5 shows a process 220 for determining a seismic attenuation factor for near-surface subsurface formations. The recorded signal at the receiver and a numerical representation of the generated signal at the source can be used by the data processing system 250 of FIG. 6 for performing the process 220 of FIG. 5. In an aspect, a quality factor engine 254 of the data processing system 250 is configured to receive the seismic data 252 and generate Q factor values data 262 of the intervals using a series of modules. The quality factor engine 254 can include a vertical seismic profile module 256, and a quality factor estimation module 258.

To perform the process 220 of FIG. 5, the data processing system 250 receives (222) or obtains data from the dual sensor at the marine surface. The dual sensor includes a hydrophone and a geophone. The dual sensor is configured to provide at least the vertical component for each response of the hydrophone and the geophone. While all three components (including an x-component, a y-component, and a z-component) can be included, only the vertical component is used for the process 220. The hydrophone response is different from the geophone response. The hydrophone response includes a scalar measurement that is not affected by a direction from which the seismic signal (the seismic vibrations or waves) are received in the hydrophone. The geophone response includes a vector. A polarity of the response changes depending on a direction from which the seismic signal arrives at the geophone. The data processing system 250 is configured to transform the hydrophone response into a geophone response signal. The data processing system 250 performs the transformation by applying a matching filter to the hydrophone signal and the geophone signal.

Figure 8A:
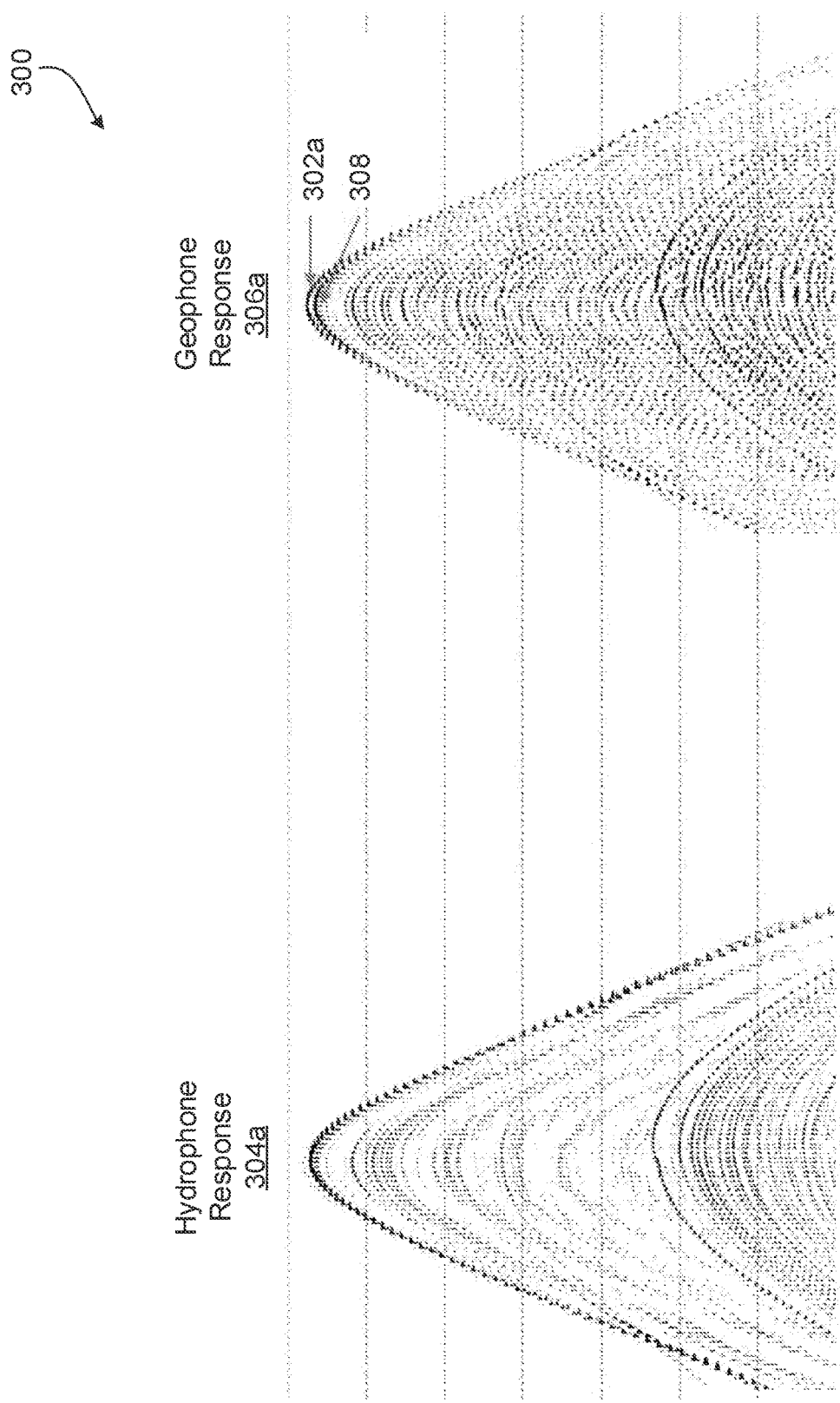
FIG. 8A shows an example of a hydrophone response and a geophone response.

FIG. 8A shows a graph 300 including an example of a hydrophone response 304a and a geophone response 306a measured at the dual sensor. The hydrophone response 304a and the geophone response 306a each are measurements at the hydrophone and geophone, respectively, of the seismic signal in the subterranean formation. The hydrophone response 304a and the geophone response 306a have not been filtered or processed as shown in graph 300. As shown in the geophone response 306a, a ghost signal 308 is shown following the first breaks 302a of the signal. To remove the ghost signal, match filtering is performed, as subsequently discussed.

The dual sensor including the geophone and hydrophone is deployed close to the well location. The proximity of the dual sensor to the well enables the data processing system 250 to use the signals provided by the dual sensor for performing a cross ghosting signature summation. To estimate Q properly, the reference trace should be free of source ghost signals that interfere with the direct arrival energy.

Figure 8B:
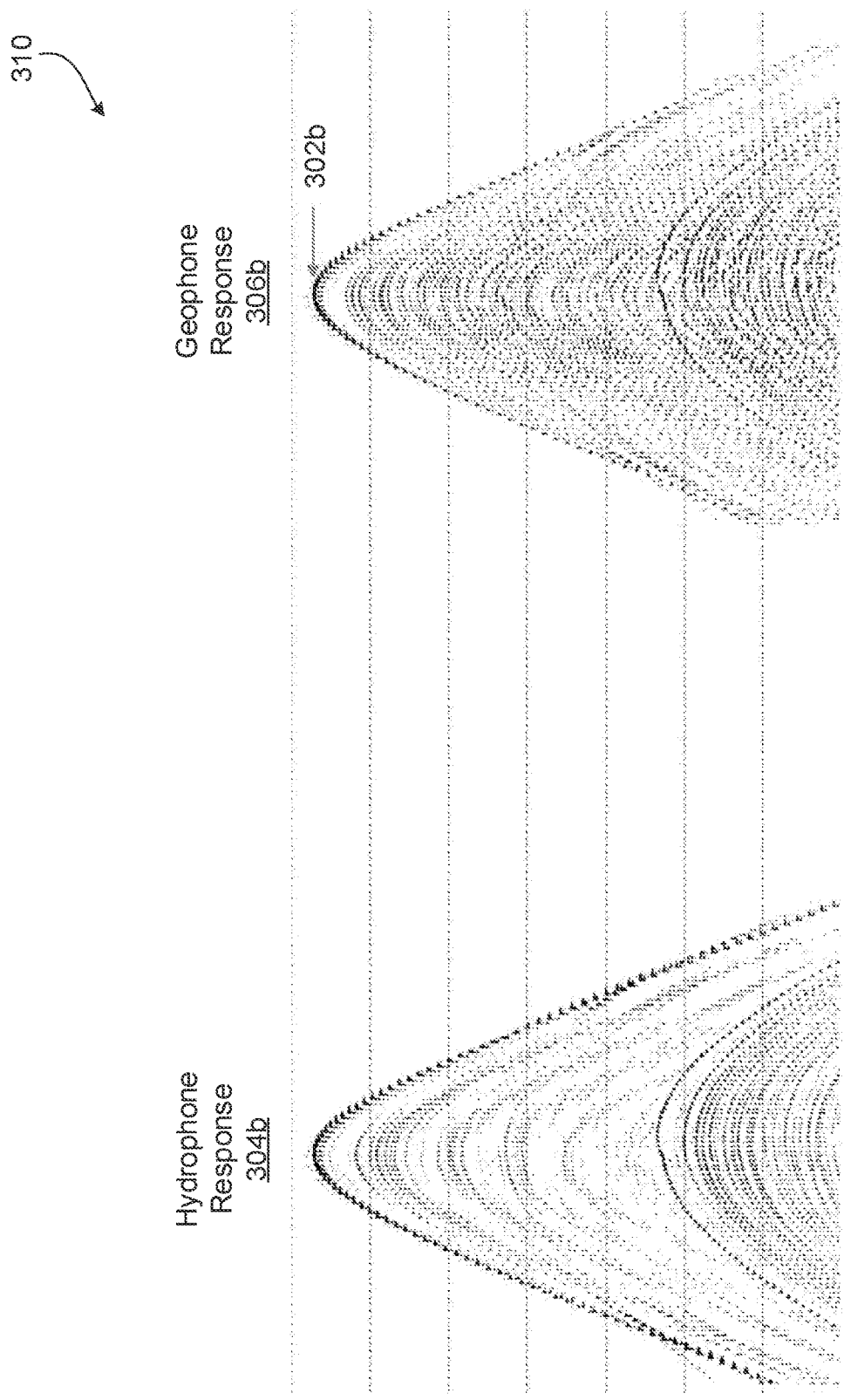
FIG. 8B shows an example of a filtered hydrophone response and a filtered geophone response after match filtering is performed on the hydrophone response and the geophone response of FIG. 8A.

The hydrophone component of the signal is a scalar quantity. The ghost signal has an opposite polarity for the geophone component of the dual sensor than for the hydrophone component. The matching filter is applied by the data processing system 250 for each of amplitude and phase of the dual sensor signals. Application of the matching enables the data processing system 250 to sum the hydrophone and geophone signals (224) to remove the source ghost effect. The resulting signal represents a location at the marine surface (such as a sea floor) is used as the reference trace for Q estimation in the VSP data. FIG. 8B shows an example of a filtered hydrophone response 304b and a filtered geophone response 306b after match filtering is performed on the geophone response 304a of FIG. 8A. The matching filter is applied to each of the amplitude and phases of the geophone response 306a. As shown in graph 310, the hydrophone response 304b is unchanged from the hydrophone response 304a. The ghost effects 308 of the geophone response 306a are removed from the filtered geophone response 306b. Instead, the first breaks 302b of the filtered response 306b show no ghost signals.

The data processing system 250 determines a source signature deconvolution operator (226). The data processing system 250 records the source signature using a far-field hydrophone sensor before the signal travels through the subterranean environment, which has an impulse response. The recorded seismic data is represented by a convolutional model $x(t)=s(t)*w(t)*e(t)$, where $s(t)$ is the source signature, $w(t)$ is the earth's effective wavelet, and $e(t)$ is reflectivity. The data processing system 250 deconvolves the signal from the data to obtain a signal for increased temporal and vertical resolution, relative to a signal for which far-field hydrophone data (and subsequent deconvolution) are not performed.

The data processing system 250 performs obtains data including the raw pre-stack gathers for the VSP vertical component and the other two horizontal components. The data processing system 250 determines a well geometry (228). The data processing system 250 determines the geometry of the dual sensor with respect to the well. The data processing system determines values for deviation, and determines values for the shot location and offset values. Not all wells are vertical, and all well data are recorded in measured depth and not true vertical depth. For Q estimation, the data processing system 250 estimates attenuation as an anelastic rock property using a true vertical depth. The data processing system 250 receives geometry data for the well deviation and shots offsets and applies the true depths for Q estimation.

The data processing system 250 performs a first pass of a Quality Check (QC). This includes an analysis by the data processing system 250 in the pre-stack domain of each trace in the data. The data processing system 250 deletes necessary bad traces from all three components. Many factors define bad traces. A primary factor is a quality of first break picks of the signal (seen in FIGS. 8A-8B). If a trace does not show clear first breaks, the trace is eliminated from the Q estimation. Other factors that affect the trace quality include a broadening of the wavelet, ghost contamination, and signal multiples. The data processing system 250 estimates Q on downgoing waves. When the data processing system 250 cannot isolate the downgoing waves for certain traces within one wavelet length, the data processing system eliminates the trace. In this context, one wavelet length is the distance between two troughs or two peaks in the wavelet.

The data processing system 250 performs a stacking of the edited gathers (230) and performs first break picking (232) on the vertical component to create a velocity profile for the subsurface. The data processing system 250 sorts the VSP in a time axis and depth axis (T-X domain). The exact depth of the receiver is known, and therefore how long the signal took to travel from the source to that receiver. The data processing system 250 picks first breaks to provide a time-depth relationship and accurate interval velocity measurements. The data processing system 250 uses the first breaks data to estimate geometrical spreading correction (spherical divergence correction). The data processing system 250 also uses the first breaks data to acquire downgoing waves, during wavefield separation, for estimation of Q. Many approaches to wavefield separation of geometrical spreading correction are possible, and Q estimation can be performed for any data that is corrected for geometrical spreading using any type of wavefield separation method.

The data processing system 250 performs a correction for geometrical spreading (234) related to the physics of how waves propagate. To perform this step, the data processing system 250 performs a compensation of spherical divergence using the velocity profile calculated from the first break picks.

The data processing system 250 performs an estimation and compensation of the anelastic attenuation Q value. In typical VSPs, the first few traces are of relatively low quality due to the existence of multiple casing strings in the borehole. Here, a low quality trace refers to a trace from which Q values cannot be estimated due to a low quality of first breaks (as previously described). If first breaks cannot be picked, the trace is removed. Another factor includes a signal to noise ratio. If a trace has a lower signal to noise ratio than the rest of the data (by a given threshold amount), the data processing system 250 removes the trace from the analysis because that trace is highly contaminated by noise. As previously described, another factor is the wavefield separation of a trace. When the data processing system 250 cannot isolate the downgoing signal properly (due to a ghost effect, multiple contamination, upgoing leakage, and so forth), the trace is removed.

The data processing system 250 injects or includes the stacked hydrophone component (236) as the reference trace in time and depth variant Q estimation. To inject the hydrophone component, the data processing system 250 combines the hydrophone with the VSP record as a first trace and assigns a depth of 0 because the reference trace is located at the sea floor.

The data processing system 250 estimates both time and depth-variant Q values (238) using a spectral ratio method. The data processing system 250 sums the transformed hydrophone component with the geophone component of the dual sensor to be the shallowest reference trace. The reference trace is typically of low quality because the vertical component of the VSP (ZVSP) does not have good data starting from the marine surface. The process 220 increases seismic resolution by compensating for the loss of the higher frequencies related to Q. Resolution increase depends on recovered frequencies. In an example, the energy is equivalent to 120 Hz. Depending on absorption rate and an elasticity of the subterranean formation, there can be 60 Hz in the data, 80 Hz, and so forth. Seismic resolution is a factor of the velocity of the subsurface and the frequency content of the data. Additionally, the magnitude of improvement varies depending on a geology and a depth of the well. Because of these factors, resolution increase can vary between 10% to 100% better resolution.

The cross ghosting provides better transformation of the hydrophone response into the geophone response to ensure that the estimated Q value represents geology and not a numerical error from the matching filter. The dual sensor as a reference trace provides an effective Q for the near field hydrophone component, rather than the signal travelling through water to reach the VSP sensors down the well. The data processing system 250 uses the hydrophone response summed with geophone from the dual sensor deployed at the sea floor as the reference trace, and assigns the trace a depth of zero. Time and depth variant Q values are compensated to recover amplitude and phase changes due to the waves propagating in the subsurface geology.

The process described in this specification provides a more accurate estimation of Q than those performed without the reference trace provided from the dual sensor that is added. The near-surface data in VSP surveys (such as near the marine surface) are of relatively low quality in relation to typical traces of the stack. The near surface traces provide an inaccurate estimate of Q values. By injecting the hydrophone component data from the dual sensor as the reference trace, as previously discussed, the inverse Q filter applied for signal processing the seismic data provides more realistic amplitudes and phase correction for the seismic data. This approach can also on surface seismic data, and is not limited to VSP only.

The system 250 and method 220 thus provide the following features for seismic imaging. The system 250 and method 220 provide a derivation of the attenuation factor Q using the dual sensor signal as a shallowest reference trace. The system 250 and method 220 eliminate the source ghost effect from the data. The system 250 and method 220 enable a proper source signature deconvolution for marine VSP data. The system 250 and method 220 reduce uncertainties of depth for lookahead VSP processes.

As previously discussed, the data processing system 250 is configured to apply a spectral ratio method previously described, such as by the quality factor estimation module 258. The data processing system 250 determines (238) the spectral ratio of the spectra of the reference trace and the seismic trace. For example, the data processing system 250 obtains the spectral ratio of the amplitudes of the Klauder wavelet and the direct arrival event of the transformed receiver seismic trace of the first useable downhole receiver. The data processing system 250 generates a value for the quality factor Q, such as by quality factor estimation module 258. The Q factor can represent an attenuation of the seismic trace. The estimates of the Q-factor values are for the intervals between the source and receivers. In some implementations, a format of this estimate can include a series of numerical values of depth or time and the respective Q values. In some implementations, the Q model can be built into a model including the voxel volume of FIG. 2. Generally, seismic source far-field particle displacement values are understood to be proportional to the Vibroseis ground force (from standard Vibroseis theory), whereas the geophone receivers measure particle velocity.

In an embodiment, zero-offset VSP downgoing-P energy direct arrivals are analyzed for Q estimation. Here, Q analysis is performed using a spectral ratio. In practice, for reliable Q values, the process ensures that there is geophone coupling with the formation and that there is good cement behind casing and consistent source signature. The spectral ratio is computed to determine the attenuation or Q factor, for each depth trace with respect to the selected reference trace with-in the desired frequency bandwidth, from the downgoing-P energy direct arrival.

Generally, the spectral ratio method for determining Q factors uses Equation (1) and Equation (2)

$$Q = -\pi\left(\frac{t_2 - t_1}{m}\right) \quad (1)$$

$$m = \ln\left(\frac{A_2(f)}{A_1(f)}\right) \quad (2)$$

where $A_1$ and $A_2$ are the spectral amplitudes for direct arrivals at travel times $t_1$ and $t_2$ recorded by receivers at depths $d_1$ and $d_2$, f is frequency, ln is the natural logarithm, and m is the log of the ratio of the spectral amplitudes. m is obtained by measuring the slope of the line fitted (such as using a least square method) to the log of the spectral amplitude ratios plotted as a function of frequency. These give an interval Q factor between $d_1$ and $d_2$. The minimum and maximum frequencies for this spectral ratio method are determined by inspection. In some implementations, the frequencies can be approximately 10 to 50 Hz. The frequencies can vary depending on the source sweep specifications and noise content. To fit straight lines to these spectral ratios, noisy band edges are generally avoided. The recorded trace at $d_1$ can be called a reference trace. In the present disclosure, the reference trace is the source Klauder wavelet trace, and $A_1$ is the Klauder amplitude spectra at time $t_1=0$ seconds and $d_1=0$ meters.

For determining the Q factor for the shallow region from the source at the marine surface to the first downhole receiver, $A_1$ is the Klauder wavelet amplitude spectra at time $t_1=0$ seconds and depth $d_1=0$ meters, and $A_2$ is the amplitude spectra of the direct arrival event at time $t_2$ of the first useable downhole receiver from the ground level surface at depth $d_2=0$ meters.

Figure 7:
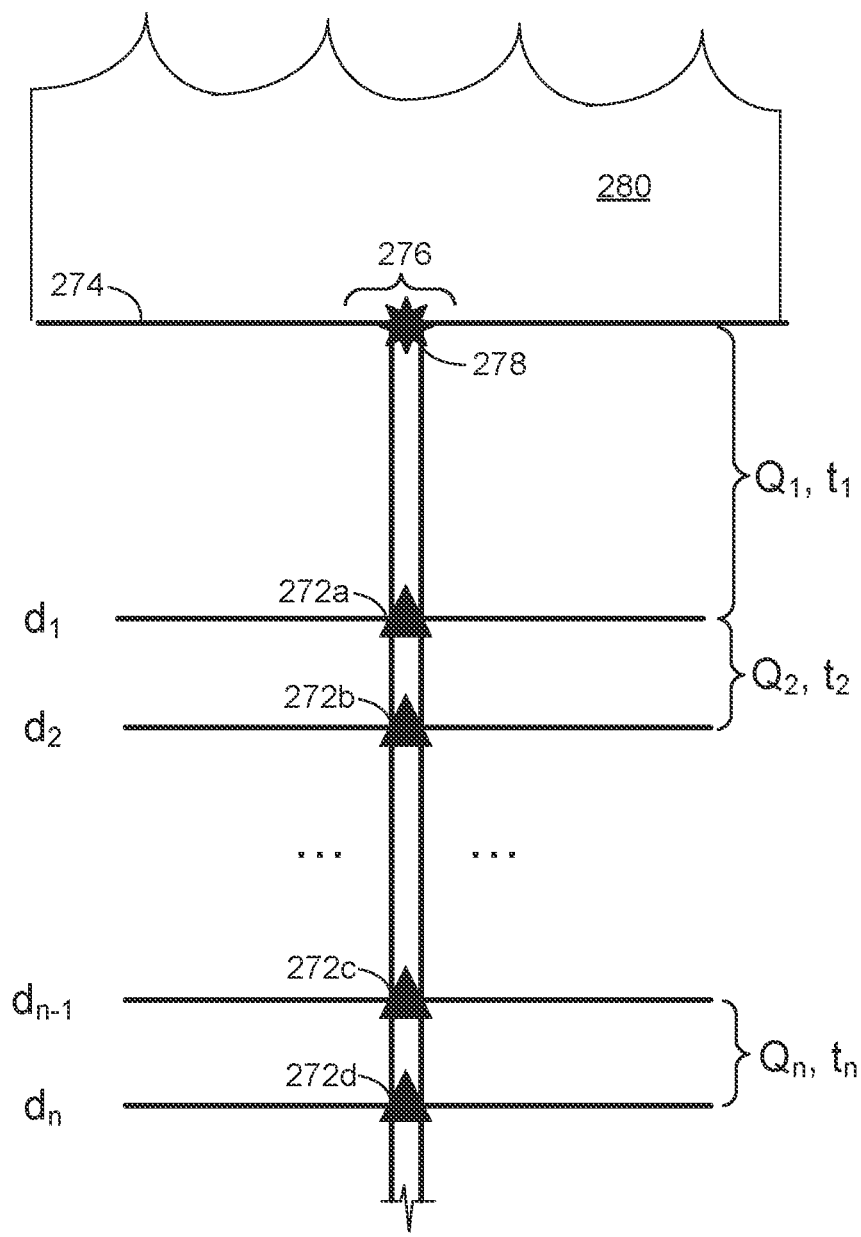
FIG. 7 shows an example well.

FIG. 7 shows an example of a Q model 270 that is generated as a result of the processes described in reference to FIGS. 5-6. Wellbore 276 is present in the seismic environment in a marine region 280, similar to wellbore 117 of FIG. 1. Dual-sensor 278, including a hydrophone and geophone as previously described, and receiver sensors 272a-d (similar to sensors 116) are placed at or in the wellbore 276. Sensor 272a is at depth $d_1$, 272b is at depth $d_2$, and forth until the nth sensor 272d at depth $d_n$. Any number of sensors 272 can be included, but four sensors are shown for illustrative purposes. Distances $d_1$-$d_n$ can be deeper than 1 kilometer. For each interval between receivers 272a-d, an interval Q value Q and associated time t are generated for the wellbore to generate a wellbore profile. This can be performed using Equations 1 and 2 as previously discussed. The number n of $Q_n$ values is based on the number n of sensors 272. As previously stated, the Q values $\{Q_1, t_1, Q_2, t_2, \ldots Q_n, t_n\}$ can form a model that is a number sequence or a more complex 3-dimensional representation for combining with the voxel model of FIG. 2. The use of the dual sensor provides for more accurate Q values near the surface, such as for $Q_1$, $t_1$, or any of the other Q values shown for FIG. 7.

Figure 9:
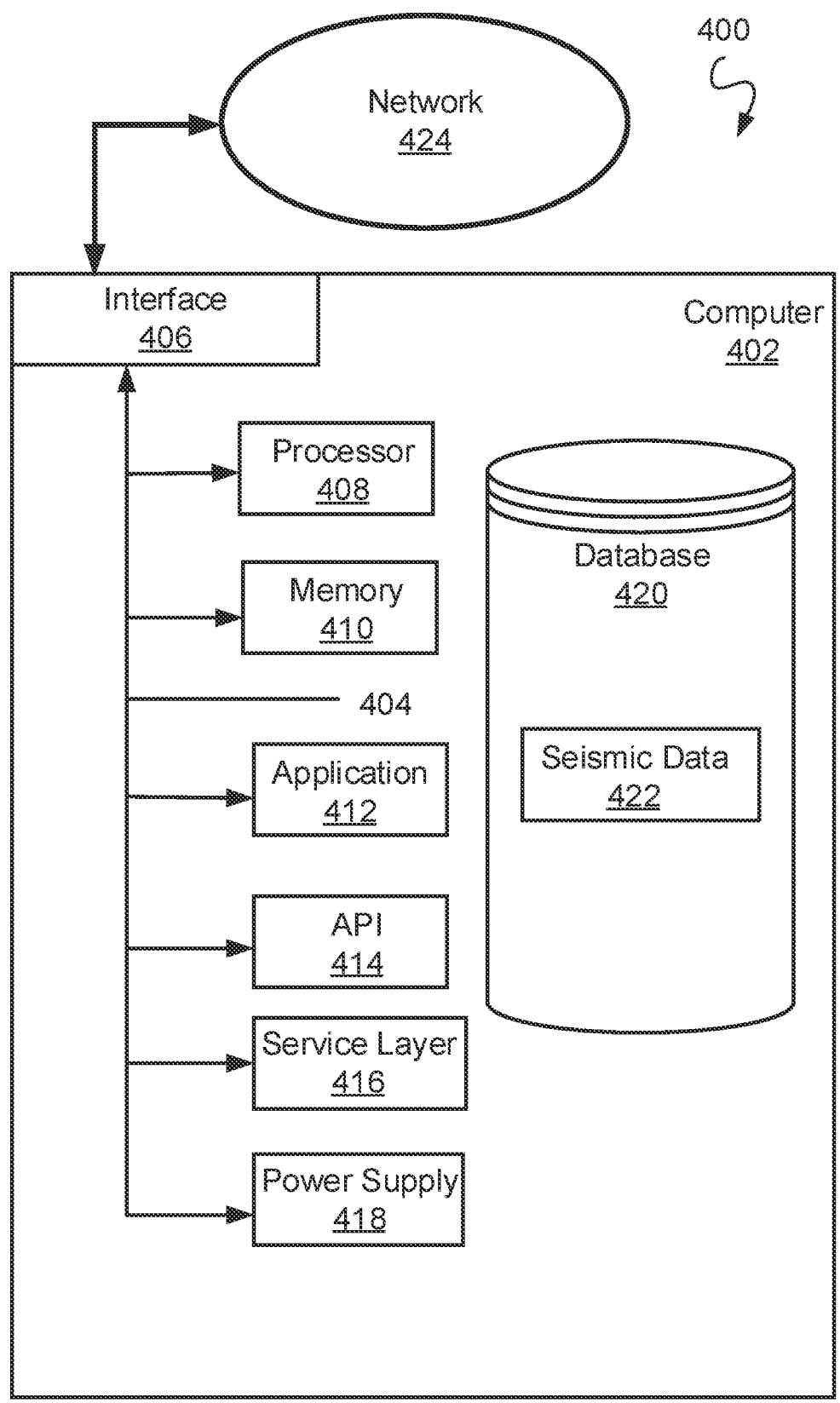
FIG. 9 is a diagram of an example computing system.

FIG. 9 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 9, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 9, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 9, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 9, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:
1. A method for determining a seismic attenuation quality factor Q for seismic signals at intervals of subsurface formations between a seismic source at a marine level surface and one or more receivers of a well, the method comprising:
  obtaining sensor data from a dual sensor comprising a hydrophone and a geophone, the sensor data including a hydrophone component and a geophone component;
  generating a reference trace from the hydrophone component and the geophone component of the sensor data;
  receiving vertical seismic profile traces;
  perform a first break picking of the vertical seismic profile traces;
  generating, based on the first break picking, vertical seismic profile data representing particle motion measured by a first receiver of the one or more receivers of the well;
  injecting the reference trace into the vertical seismic profile data;
  determining a ratio of spectral amplitudes of a direct arrival event of the vertical seismic profile data and the reference trace; and
  generating, from the ratio, a quality factor Q representing a time and depth compensated attenuation value of seismic signals between the seismic source at the marine level surface and the first receiver.

2. The method of claim 1, wherein generating a reference trace from the hydrophone component and the geophone component of the sensor data comprises:
   applying a matching filter to transform the hydrophone component of the sensor data to match the geophone component; and
   summing the transformed hydrophone component and the geophone component.

3. The method of claim 1, further comprising:
   comparing each trace of the vertical seismic profile traces to a quality threshold; and
   removing, from the vertical seismic profile traces, each trace that does not satisfy the quality threshold.

4. The method of claim 1, further comprising:
   determining a geometry of the well and a location of the dual sensor; and
   performing a correction on the vertical seismic profile traces to account for a geometrical spreading of propagating seismic signals used to generate the vertical seismic profile data.

5. The method of claim 1, wherein the dual sensor is deployed at or near a well location at the marine level surface of the subsurface formation.

6. The method of claim 1, wherein the ratio is defined by $$Q = -\pi\left(\frac{t_2 - t_1}{m}\right),$$
$$m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is the natural logarithm of the ratio of the spectral amplitudes.

7. The method of claim 6, wherein $A_1$ is a Klauder wavelet amplitude spectra at time $t_1=0$ seconds and depth $d_1=0$ meters, and $A_2$ is the amplitude spectra of the direct arrival event at time $t_2$ of the first receiver from the marine level surface at depth $d_2=0$ meters.

8. A system for determining a seismic attenuation quality factor Q for seismic signals at intervals of subsurface formations between a seismic source at a marine level surface and one or more receivers of a well, the system comprising:
   at least one processor; and
   a memory storing instructions that, when executed by the at least one processor, cause the at least one processor to perform operations comprising:
      obtaining sensor data from a dual sensor comprising a hydrophone and a geophone, the sensor data including a hydrophone component and a geophone component;
      generating a reference trace from the hydrophone component and the geophone component of the sensor data;
      receiving vertical seismic profile traces;
      perform a first break picking of the vertical seismic profile traces;
      generating, based on the first break picking, vertical seismic profile data representing particle motion measured by a first receiver of the one or more receivers of the well;
      injecting the reference trace into the vertical seismic profile data;
      determining a ratio of spectral amplitudes of a direct arrival event of the vertical seismic profile data and the reference trace; and
      generating, from the ratio, a quality factor Q representing a time and depth compensated attenuation value of seismic signals between the seismic source at the marine level surface and the first receiver.

9. The system of claim 8, wherein generating a reference trace from the hydrophone component and the geophone component of the sensor data comprises:
   applying a matching filter to transform the hydrophone component of the sensor data to match the geophone component; and
   summing the transformed hydrophone component and the geophone component.

10. The system of claim 8, the operations further comprising:
    comparing each trace of the vertical seismic profile traces to a quality threshold; and
    removing, from the vertical seismic profile traces, each trace that does not satisfy the quality threshold.

11. The system of claim 8, the operations further comprising:
    determining a geometry of the well and a location of the dual sensor; and
    performing a correction on the vertical seismic profile traces to account for a geometrical spreading of propagating seismic signals used to generate the vertical seismic profile data.

12. The system of claim 8, wherein the dual sensor is deployed at or near a well location at the marine level surface of the subsurface formation.

13. The system of claim 8, wherein the ratio is defined by $$Q = -\pi\left(\frac{t_2 - t_1}{m}\right),$$
$$m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is the natural logarithm of the ratio of the spectral amplitudes.

14. The system of claim 13, wherein $A_1$ is a Klauder wavelet amplitude spectra at time $t_1=0$ seconds and depth $d_1=0$ meters, and $A_2$ is the amplitude spectra of the direct arrival event at time $t_2$ of the first receiver from the marine level surface at depth $d_2=0$ meters.

15. One or more non-transitory computer readable media storing instructions for determining a seismic attenuation quality factor Q for seismic signals at intervals of subsurface formations between a seismic source at a marine level surface and one or more receivers of a well, the instructions being configured to cause at least one processor, when executed by the at least one processor, to perform operations comprising:
    obtaining sensor data from a dual sensor comprising a hydrophone and a geophone, the sensor data including a hydrophone component and a geophone component;
    generating a reference trace from the hydrophone component and the geophone component of the sensor data;
    receiving vertical seismic profile traces;
    perform a first break picking of the vertical seismic profile traces;

generating, based on the first break picking, vertical seismic profile data representing particle motion measured by a first receiver of the one or more receivers of the well;

injecting the reference trace into the vertical seismic profile data;

determining a ratio of spectral amplitudes of a direct arrival event of the vertical seismic profile data and the reference trace; and generating, from the ratio, a quality factor Q representing a time and depth compensated attenuation value of seismic signals between the seismic source at the marine level surface and the first receiver.

16. The one or more non-transitory computer readable media of claim 15, wherein generating a reference trace from the hydrophone component and the geophone component of the sensor data comprises:

applying a matching filter to transform the hydrophone component of the sensor data to match the geophone component; and summing the transformed hydrophone component and the geophone component.

17. The one or more non-transitory computer readable media of claim 15, the operations further comprising:

comparing each trace of the vertical seismic profile traces to a quality threshold; and removing, from the vertical seismic profile traces, each trace that does not satisfy the quality threshold.

18. The one or more non-transitory computer readable media of claim 15, the operations further comprising:

determining a geometry of the well and a location of the dual sensor; and performing a correction on the vertical seismic profile traces to account for a geometrical spreading of propagating seismic signals used to generate the vertical seismic profile data.

19. The one or more non-transitory computer readable media of claim 15, wherein the dual sensor is deployed at or near a well location at the marine level surface of the subsurface formation.

20. The one or more non-transitory computer readable media of claim 15, wherein the ratio is defined by $$Q = -\pi\left(\frac{t_2 - t_1}{m}\right),$$

$$m = \ln\left(\frac{A_2(f)}{A_1(f)}\right),$$

where $A_1$ and $A_2$ are the spectral amplitudes for direct arrivals at travel times, $t_1$ and $t_2$ recorded by receivers at depths $d_1$ and $d_2$, f is frequency, ln is a natural logarithm, and m is the natural logarithm of the ratio of the spectral amplitudes.

* * * * *